United States Patent

Tseng

[11] Patent Number: 5,813,129
[45] Date of Patent: Sep. 29, 1998

[54] GUIDING DISK FOR DRILLING HOLES ON A BOWLING BALL

[76] Inventor: Shui-Chih Tseng, No. 1-2, Hsin-Liao, Lin-Kou, Taipei County, Taiwan

[21] Appl. No.: 749,651

[22] Filed: Nov. 15, 1996

[51] Int. Cl.⁶ .................. B43L 13/20; G01B 3/14
[52] U.S. Cl. .................. 33/509; 33/510; 33/562; 33/566
[58] Field of Search ............... 33/509, 510, 562, 33/563, 566, 549, 573; 73/65.02; 408/DIG. 1; 473/54

[56] References Cited

U.S. PATENT DOCUMENTS

| | | | |
|---|---|---|---|
| 3,161,041 | 12/1964 | Amburgey | 33/509 |
| 3,875,668 | 4/1975 | Taylor | 33/509 |
| 4,742,620 | 5/1988 | Manker | 33/510 |
| 5,181,325 | 1/1993 | Damon | 33/510 |
| 5,456,016 | 10/1995 | Ellison | 33/510 |
| 5,603,165 | 2/1997 | Bernhardt et al. | 33/509 |

*Primary Examiner*—Christopher W. Fulton
*Attorney, Agent, or Firm*—Bacon & Thomas

[57] ABSTRACT

A guiding disk for accurately and quickly finding drill holes on a bowling ball, for finding hole positions for certain characteristics of pushaway on different bowling balls, and for avoiding positioning any hole above that of a weight in the bowling ball. The body of the guiding disk is a transparent domed plastic plate, having a reference hole and a plurality of radiant angular lines extending from the center of the reference hole. Among the radiant lines is a reference line provided at a location of zero degrees of radiant angle. Secondary spaced apart reference lines are also provided on the disk. With such a construction, positions of the holes to be drilled can be found very quickly.

1 Claim, 8 Drawing Sheets

GUIDING DISK FOR DRILLING HOLES ON A BOWLING BALL

BACKGROUND OF THE INVENTION

1. Field of the Invention

The present invention relates to a guiding disk for drilling holes on a bowling ball and finding the correct positions of the holes for finger gripping. The guiding disk is used for finding the hole positions for certain desired characteristics on a plurality of bowling balls with different conditions to thereby help in drilling the holes.

2. Description of the Prior Art

Bowling has been a popular leisure-time exercise for many years. Although people participating in such exercise are numerous, very few of them understand the techniques about it. For example: most people only know whether the weights, sizes and depths of the holes for finger gripping of some bowling balls are suitable for themselves to grip and to pushaway, but they know nothing about the fact that the positions of the holes can affect the action of a rolling ball.

In fact, bowling balls of different brands have different surface grip, dynamic characteristics, oil absorbent power and curving reaction etc. These factors can be changed in regard to the dryness and/or oiliness of the bowling lanes. Bowling balls of the same brand can have different characteristics due to the variables relating to the ball centers during filling or forming. The characteristics having little difference with respect to one another can only be known by repeated tests, and are not manifest. Techniques of hole drilling can almost be known in no time. For example: provided that the characteristics of the bowling balls, the ball pushaway speed and strength of a bowler are all the same, different positions of the drilled holes can induce different rolling traces for the bowling balls, which can affect the paths of the bowling balls.

Such influence in rolling traces and changing of paths of bowling balls induced by different positions of the drilled holes can be detected technically. Primarily, bowling balls have different centers of gravity, e.g.: when a bowling ball is placed on water, it will float by buoyancy, and when it is completely still, the lowermost point on the bowling ball will be exactly the point under the center of gravity of the bowling ball, and also this is the balance point of the bowling ball. When the ball is weighed on a DODO scale, the bowling ball will be balanced at the vicinity of the center of gravity thereof. Moreover, every bowling ball has a center as the ball's center is marked on the surface of the ball when the ball is made, normally called a "PIN". This will normally not be at the same location as that of the center of gravity which is also marked on the surface of the ball when the ball is made. The distance between the center of gravity and the ball's center of a given ball is not the same as that of the other balls, but may vary about 0.5–1.5 in. In the terminology for bowling balls, such a distance less than 1 inch is called "PIN IN", while a distance over 1 inch is called "PIN OUT". When a ball is pushed away, its center of gravity and ball's center coordinate with each other in the path of the ball to develop its power. Accordingly, centers of gravity and ball's centers become the most important references for hole drilling.

Concerning the problem in choosing the position to drill holes to allow bowlers to get better stability and destructibility when pushing away the ball, this is not in the area of the present invention. What is to be improved by the present invention relates to defects of the conventional measuring tool for drilling holes, because these defects render people unable to correctly determine the positions of the drill holes on the balls.

As is shown in FIG. 1, the conventional measuring tool used before drilling holes is an annular rule 1, the diameter of the inner rim thereof is equal to that of the external periphery of a bowling ball. A semi-circular rule 2 is provided on the annular rule 1 and straddles the two ends of a diameter extending through the center of the rule 1, the semi-circular rule 2 is orthogonal to the annular rule 1 with the same center as that of the annular rule 1. A quarter circular rule 3 orthogonally extends from the middle of the semi-circular rule 2, the bottom of the quarter circular rule 3 being connected to the top of the annular rule 1. The quarter circular rule 3 is also orthogonal to the annular rule 1 as is shown in FIG. 1, and also has the same center as that of the annular rule 1 and the semi-circular rule 2.

The above stated conventional measuring tool used before drilling holes has the following disadvantages:

1. When in use, the annular rule 1 must be fitted on the bowling ball to be drilled, the semi-circular rule 2 then is aligned with a line passing through the center of gravity and the ball's center with a reference line drawn on the bowling ball. Then, a line is drawn orthogonal to the reference line taking advantage of the quarter circular rule 3, and another line is drawn along the inner circular rim of the annular rule 1. These three lines are used to find the positions of the holes to be drilled. When the annular rule 1 is fitted on the bowling ball, a gap will exist between the inner circular rim thereof and the periphery of the bowling ball, the width of such gap varying for each individual bowling ball. Thus, the line drawn with the annular rule 1 is not accurate. The measuring tool must be angularly displaced 90 degrees such that the semicircular rule 2 is now aligned with the line drawn with the quarter circular rule 3 as stated above. A second line is drawn along the inner circular rim of the annular rule 1, the second line may be parallel to or cross the first line drawn as stated above. Therefore, a third line may have to be drawn between these two lines for obtaining an accurate reference line. Such procedure is bothersome and time wasting.

2. The above mentioned PIN of a bowling ball is located above a weight which is placed in the surface of the bowling ball with a diameter of about 3 inches, and the material of the weight is different from that of the surface and the core of the bowling ball. When drilling, measurement with the above mentioned conventional annular rule cannot avoid the result that some of the hole measured positions will be right above the position of the weight. In this case, when the drilling bit penetrates the surface layer of the bowling ball to the location of the weight, due to the different material they are made of the resulting holes resulted will be inclined. This renders it difficult for a bowler to control the bowling ball when he grips it.

3. Since the conventional measuring tool used before drilling holes does not provide angle indications, and since the positions of the center of gravity of the bowling ball and the ball's center are not the same, a bowler cannot readily find suitable hole positions on a new bowling ball when he wants to change an old bowling ball for a new bowling ball. He can only find the approximate positions for the holes. This results in an unstable pushaway for the bowler. A period of adjustment must be undertaken by the bowler to gradually adapt himself to the new bowling ball. Sometimes, the bowlers skill may retrograde because of this.

SUMMARY OF THE INVENTION

In view of this disadvantage of the above stated conventional measuring tool used before drilling holes, the present invention provides a guiding disk for drilling holes on a bowling ball, for finding suitable hole positions for certain characteristics of pushaway mode on every new bowling ball with different conditions in order to be expedient in hole drilling, and for eliminating the disadvantages of the prior art.

A guiding disk for accurately and quickly finding drill holes on a bowling ball, for finding hole positions for certain characteristics of pushaway on different bowling balls, and for avoiding positioning any hole above that of a weight in the bowling ball. The body of the guiding disk is a transparent domed plastic plate, having a reference hole and a plurality of radiant angular lines extending from the center of the reference hole. Among the radiant lines is a reference line provided at a location of zero degrees of radiant angle. Secondary spaced apart reference lines are also provided on the disk. With such a construction, positions of the holes to be drilled can be found very quickly.

The present invention will be apparent in its practical structure and characteristics after reading the detailed description of the preferred embodiment thereof in reference to the accompanying drawings.

DETAILED DESCRIPTION OF THE PREFERRED EMBODIMENT

Figure 1:
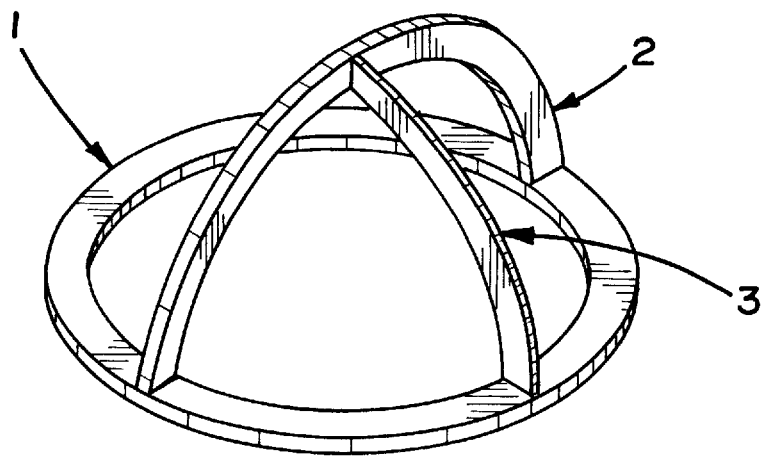
FIG. 1 is a perspective view of the conventional measuring tool before drilling holes.
Figure 2:
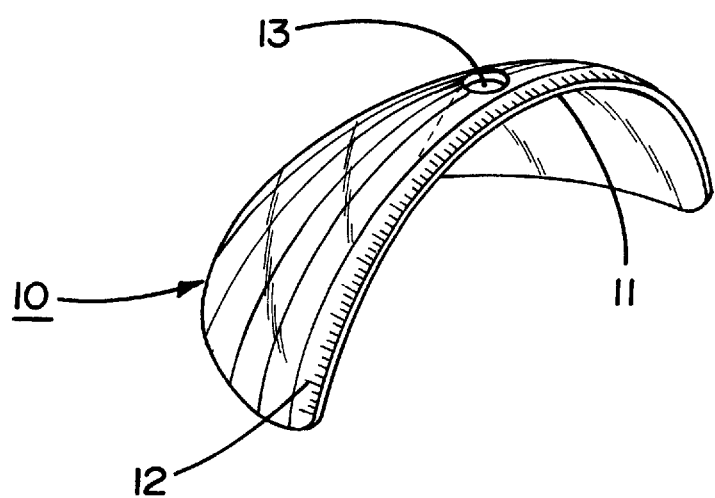
FIG. 2 is a perspective view of the present invention.
Figure 3:
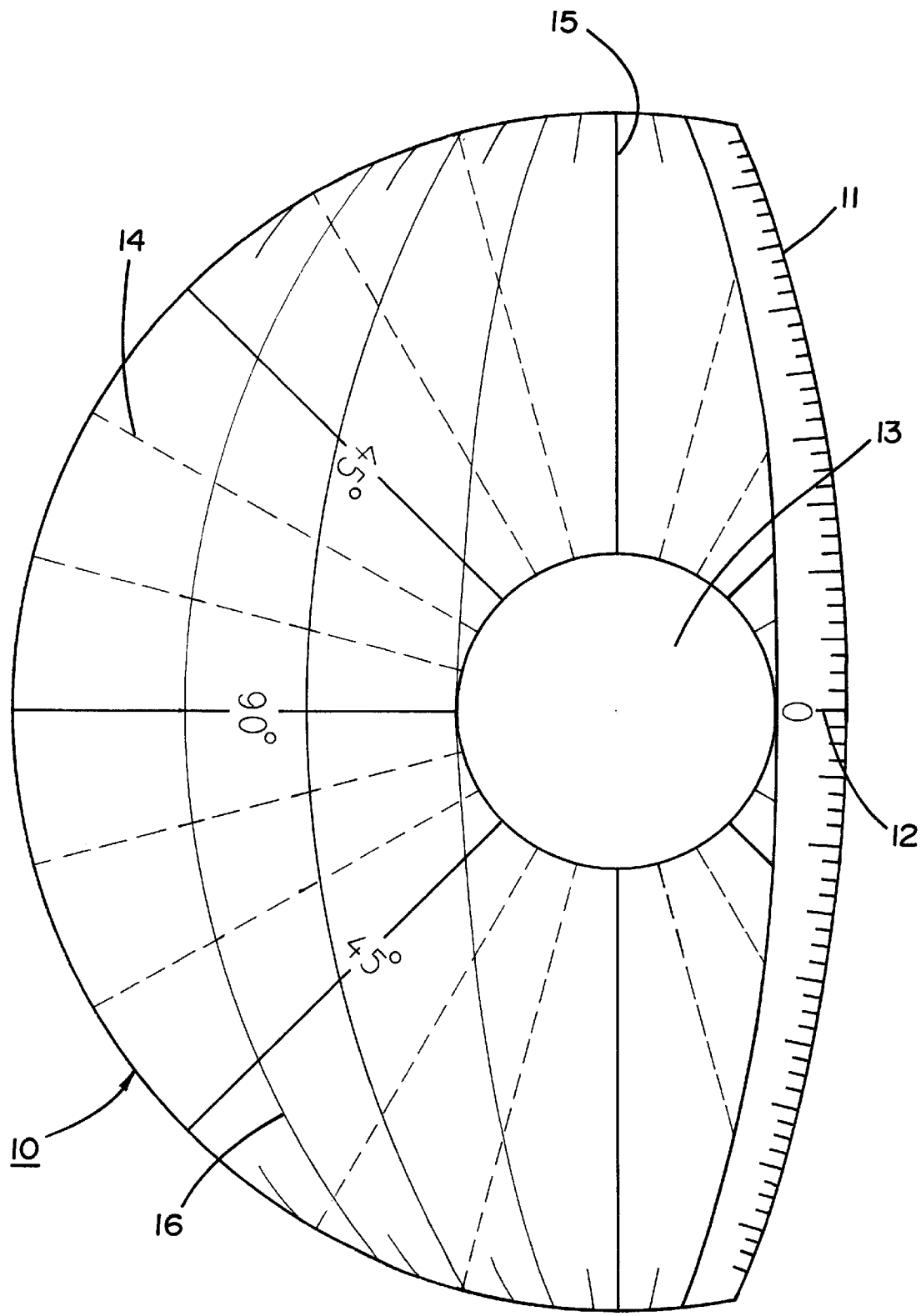
FIG. 3 is a top view of the present invention.

In reference to FIGS. 2 and 3, a guiding disk used for drilling holes on a bowling ball can be seen. The body 10 of the guiding disk is a transparent domed plastic plate, the radian thereof is the same as that of the surface of a common bowling ball. The upper edge 11 of the body 10 is marked with indices 12, a reference hole 13 which is a round hole is formed at a position near the middle of the indices 12 on the upper edge 11 of the body 10, the diameter of the reference hole 13 is about 3 inches. A plurality of radiant angular lines 14 are drawn on the body 10, among the radiant angular lines 14, there is a reference line 15 provided at the location of zero degree of radiant angle, a plurality of secondary reference lines 16 with the same interspace therebetween are also provided on the body 10.

Figure 4:
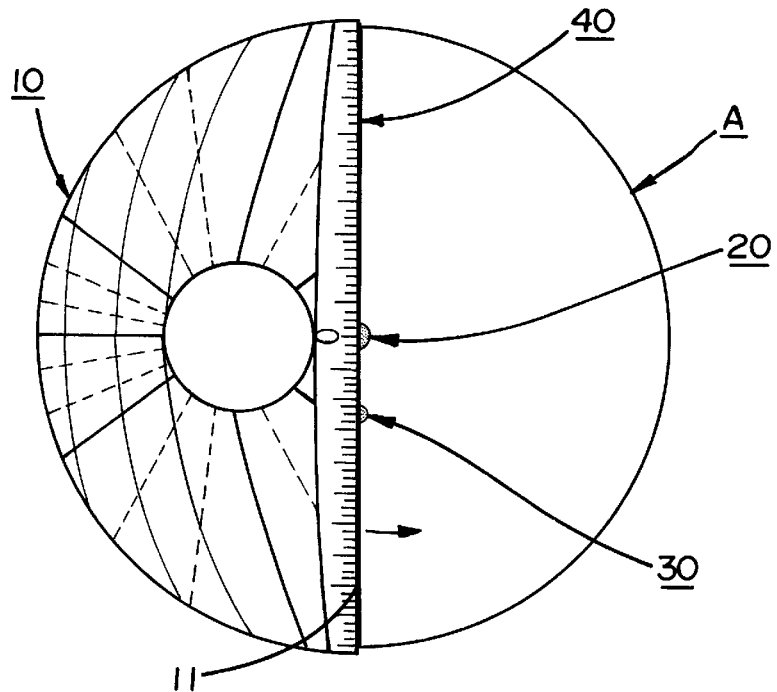
FIG. 4 shows a first alignment line drawn along the upper edge of the guiding disk.

In use, the body 10 is fittedly placed on the surface of a bowling ball A with the upper edge 11 thereof aligned with the ball's center 20 and the center of gravity 30 of the bowling ball A and a line is drawn on the bowling ball A as is shown in FIG. 4, which line extends through the ball's center 20 and the center of gravity 30, to form a first alignment line 40. At this time, the radian of the body 10 is the same as that of the surface of the common bowling ball A, so that the inner surface of the body 10 can completely contact the bowling ball A or any common bowling ball although they may be slightly different in size. Thus, the first alignment line 40 drawn will not be deviated, thereby avoiding the inaccurate drawing of a reference line by the prior art device.

Figure 5:
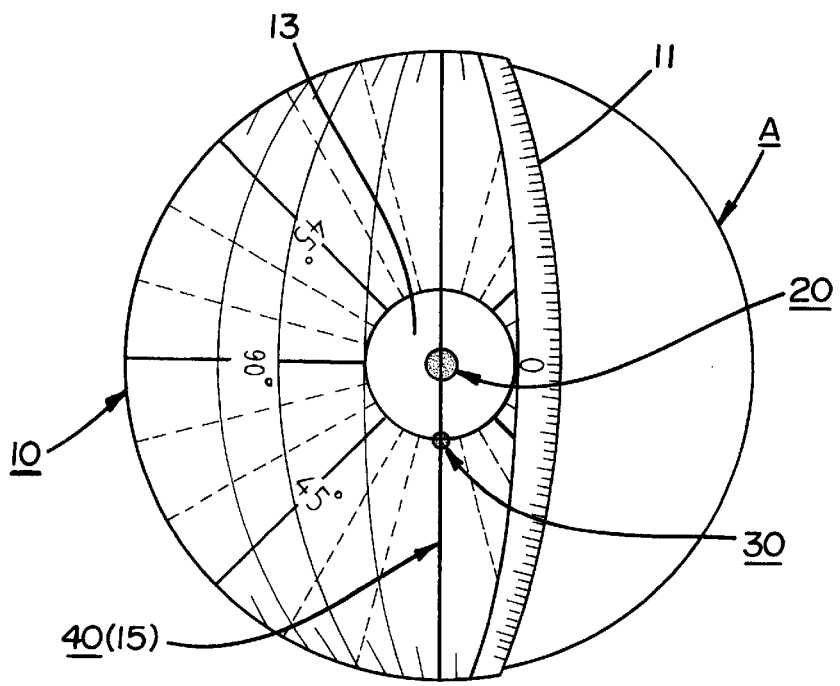
FIG. 5 shows a reference hole surrounding the center of a bowling ball, and the first alignment line superimposes a reference line.
Figure 6:
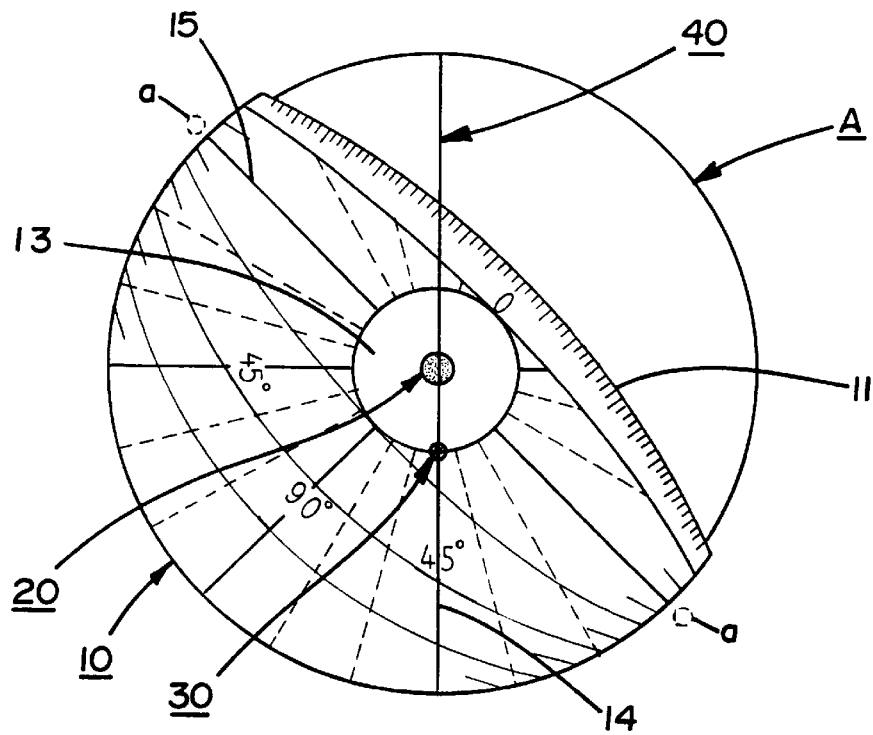
FIG. 6 shows the guiding disk rotated to render the first alignment line to superimposed with a line of a predetermined angle.
Figure 7:
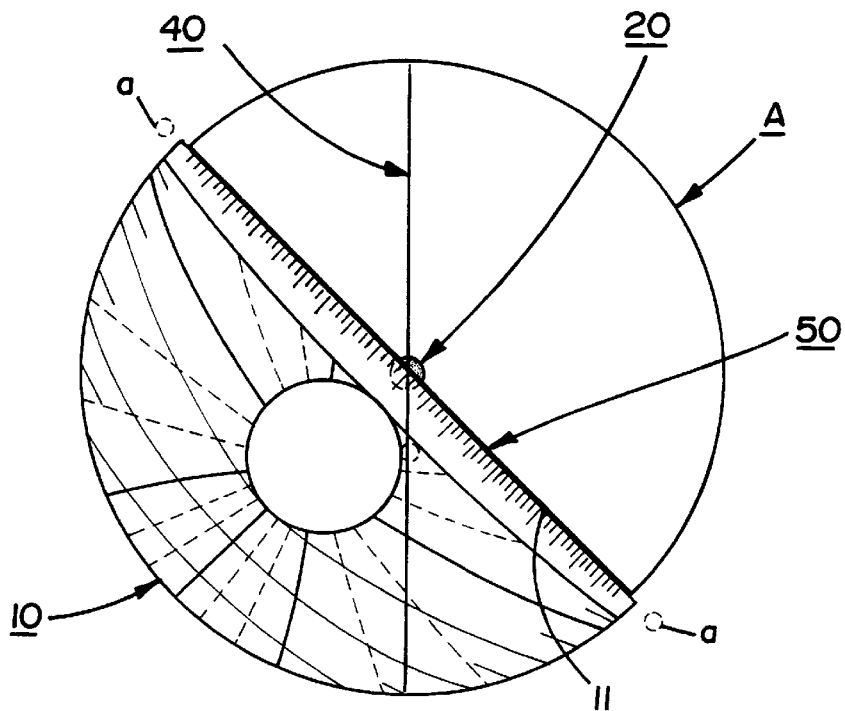
FIG. 7 shows a second alignment line drawn along the upper edge of the guiding disk.
Figure 8:
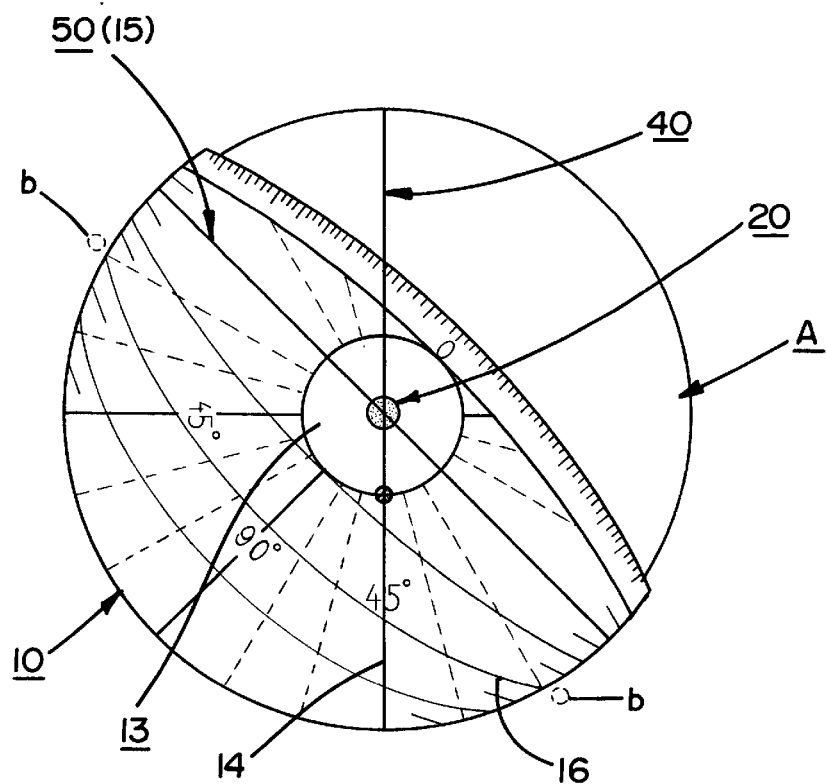
FIG. 8 shows the second alignment line superimposed on the reference line, and marks given by means of a secondary reference line.
Figure 9:
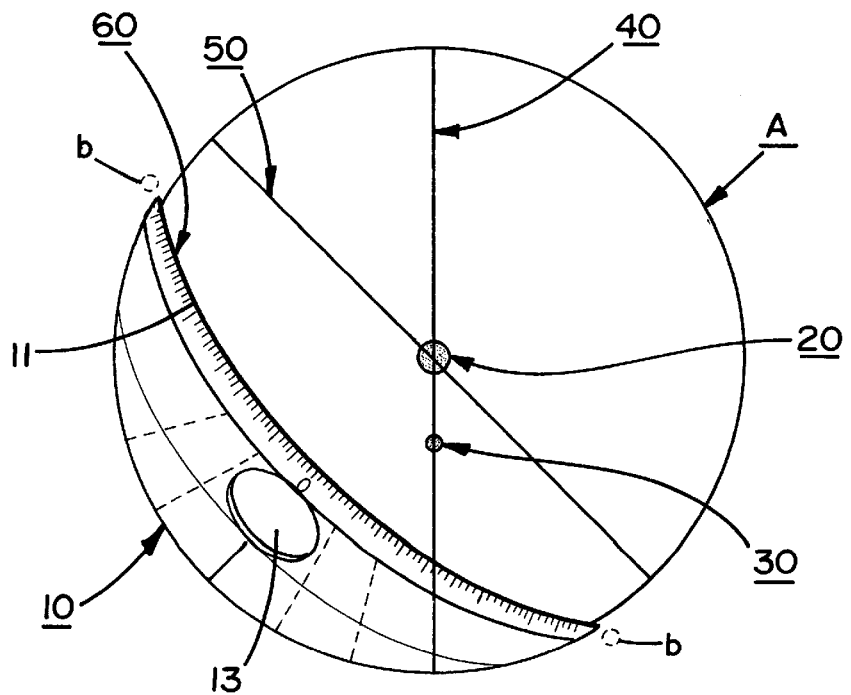
FIG. 9 shows a third alignment line drawn along the upper edge of the guiding disk.

The second step of the present invention is to locate the reference hole 13 of the body 10 to encircle the ball's center 20 of the bowling ball A as is shown in FIG. 5. The body 10 is rotated to align the first alignment line 40 with any one of a plurality of angular lines 14 (FIG. 6), and two marks "a" are drawn on the bowling ball A at the two ends of the reference line 15 for drawing a second alignment line 50 extending through the ball's center 20 by means of the upper edge 11 of the body 10. Lastly, the second alignment line 50 is aligned with the reference line 15 on the body 10 (FIG. 8), again the reference hole 13 of the body 10 is located to encircle the ball's center 20, and two marks "b" are drawn on the bowling ball A at the two ends of a secondary reference line 16 on the body 10 for drawing on the bowling ball A a third alignment line 60 (FIG. 9) which is the reference in drilling holes. A thumb hole 70 and two smaller holes 80 are drilled respectively on the third alignment line 60 and at two positions aside of and equidistant to the third alignment line 60, these holes 70, 80 are determined further by the size of a palm, and wherein the thumb hole 70 is located on the meeting point of the first alignment line 40 with the third alignment line 60. The hole drilling thus is completed.

Figure 11:
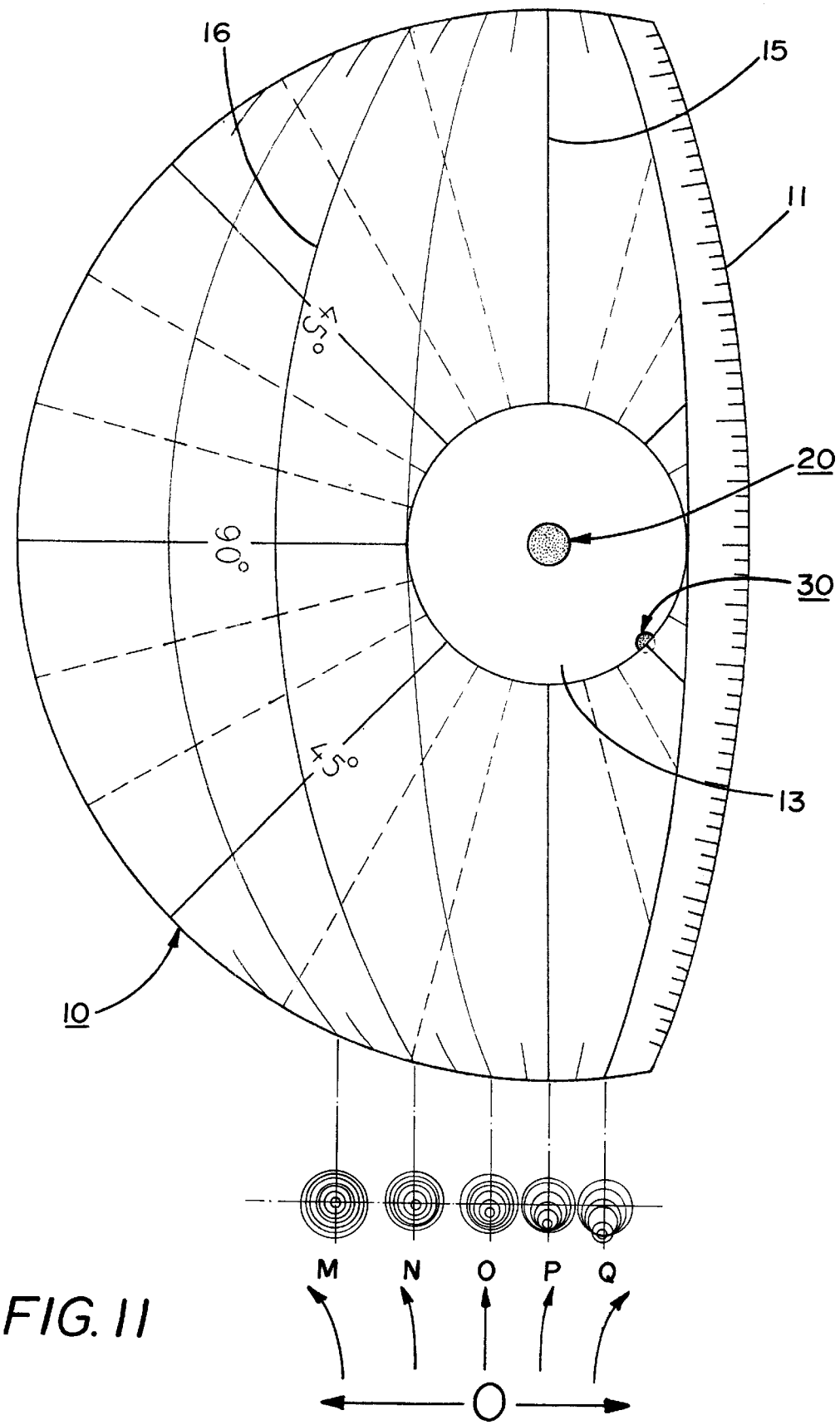
FIG. 11 shows a plurality of secondary reference lines which are corresponding to different rotation modes of bowling balls.

Referring to FIG. 11, the positions of holes located by the above stated method are found in reference to one of the secondary reference lines 16, the distances from the drilling positions to the center of gravity 30 and the ball's center 20 will be different if another secondary reference line 16 is used as a reference for drilling. Therefore, rotational forces obtained through coordination of the center of gravity 30 and the ball's center 20 will be different, and are applicable to bowlers having various pushaway modes. As is shown in FIG. 11, the rotation mode M is applicable to sharp curve balls, its ball path is more stable and with weak destructibility to pins; the rotation mode N is applicable to mild curve balls, its ball path is less stable and with a little higher destructibility to pins; the rotation mode P is applicable to mild back curve balls, its ball path is even less stable and with even higher destructibility to pins; while the rotation mode Q is applicable to sharp back curve balls, its ball path is most unstable and with the highest destructibility to pins. The rotation mode O is applicable for straight balls, stability of its ball path and destructibility thereof to pins are all medium relatively. In other words, by means of the construction of the present invention, positions of the holes to be drilled and suitable for bowlers using various rotation modes of pushaway can be found very quickly, so that the present invention has the advantage of convenience.

Figure 10:
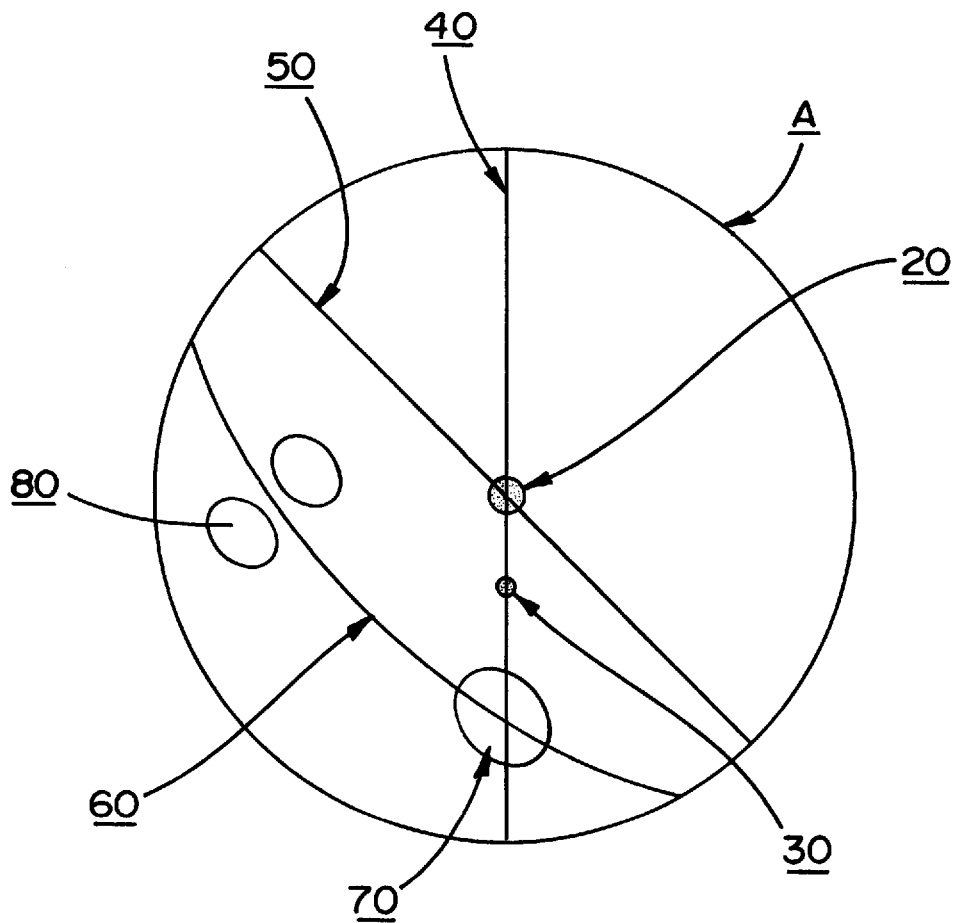
FIG. 10 shows holes drilled in reference to the third alignment line.

Referring further to FIG. 10, another function of the present invention is to quickly find out the positions of the holes to be drilled on a new bowling ball according to the drilled holes on an old bowling ball, such positions of holes suit persons having the same pushaway rotation mode. The procedure is quite contrary to the method stated above. It only requires a third alignment line 60 to be drawn on the old bowling ball according to the positions of the existing holes, i.e., in reference to FIG. 10, the third alignment line 60 can be drawn on the old bowling ball by connecting the middle point between the two smaller holes 80 and center of the thumb hole 70. Then the second alignment line 50 is drawn by displacing the guiding plate in the direction perpendicular to the third alignment line 60 until the upper edge 11 thereof is aligned with the ball's center 20. Lastly the first alignment line 40 is drawn according to the method stated above in reference to FIG. 4, i.e., the first alignment line 40 is drawn along the path extending through the ball's center 20 and the center of gravity 30. In this way, the relationship between the holes 70, 80 drilled on the old bowling ball and the center of gravity 30 as well as the ball's center 20, will be the same as on a new bowling ball.

Figure 12:
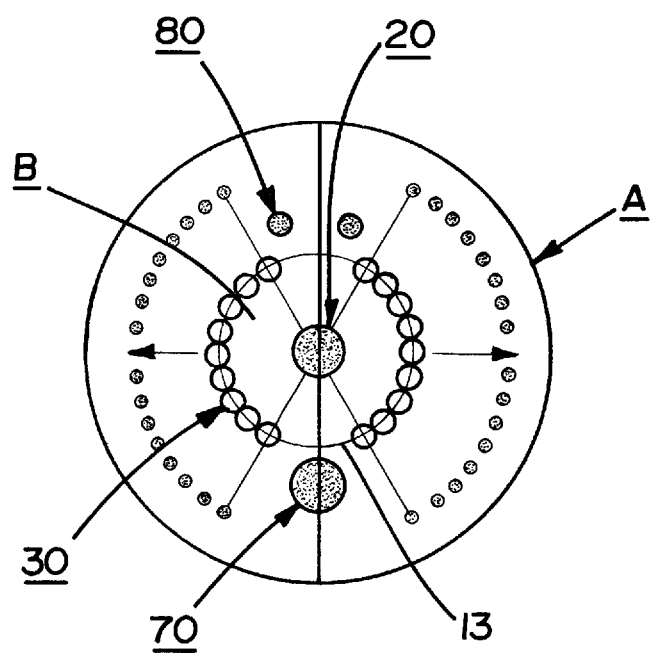
FIG. 12 shows the relationship between finding of the drill holes in accordance with a reference hole and the position of the weight in the bowling ball.

Referring to FIG. 12, the present invention has a further function, i.e., it can avoid the disadvantage of having hole located above the weight B, so that it can prevent the holes from inducing uncomfortable pushing away of a bowling ball. The main reason is that, before drilling, when the three alignment lines are found, the reference hole 13 of the body 10 always encircles the ball's center 20 of the bowling ball A. In other words, the position of the reference hole 13 is above and the size thereof is almost the same as that of the weight B, so that the hole positions will never be above the weight B.

My invention may assume numerous forms and is to be construed as including all modifications and variations falling within the scope of the appended claims.

Having now particularly described and ascertained the nature of our said invention and in what manner the same is to be performed, I declare that what I claim is:

1. A guiding disk for drilling holes on a bowling ball, the body of said guiding disk is a transparent domed plastic plate, the radian thereof is the same as that of the surface of a common bowling ball, the upper edge of said body is marked with indices, a reference hole which is a round hole is formed by excavation at a position near the middle of said indices, said reference hole is above and the size thereof is almost the same as that of a weight in said bowling ball, a plurality of radiant angular lines are prepared and extend from the center of said reference hole, among said radiant angular lines, there is a reference line provided at the location of zero degree of radiant angle, a plurality of secondary reference lines with the same interspace therebetween are also provided on said body, by means of the above construction, positions of said holes to be drilled can be found very quickly.

\* \* \* \* \*